United States Patent
Di Stefano

(10) Patent No.: US 8,445,112 B2
(45) Date of Patent: May 21, 2013

(54) FILM COATED GLAZING HAVING A PROTECTIVE LAYER OF MIXED TITANIUM OXIDE

(75) Inventor: Gaetan Di Stefano, Jumet (BE)

(73) Assignee: AGC Glass Europe, Brussels (BE)

(*) Notice: Subject to any disclaimer, the term of this patent is extended or adjusted under 35 U.S.C. 154(b) by 0 days.

(21) Appl. No.: 12/933,542

(22) PCT Filed: Mar. 20, 2009

(86) PCT No.: PCT/EP2009/053294
§ 371 (c)(1),
(2), (4) Date: Sep. 20, 2010

(87) PCT Pub. No.: WO2009/115599
PCT Pub. Date: Sep. 24, 2009

(65) Prior Publication Data
US 2011/0020638 A1    Jan. 27, 2011

(30) Foreign Application Priority Data
Mar. 20, 2008   (EP) .................................... 08102820

(51) Int. Cl.
*C03C 17/36* (2006.01)
(52) U.S. Cl.
USPC ........... 428/432; 428/426; 428/428; 428/433; 428/697; 428/698; 428/699; 428/701; 428/702

(58) Field of Classification Search
USPC ................. 428/428, 426, 432, 688, 689, 697, 428/699, 701, 702
See application file for complete search history.

(56) References Cited

U.S. PATENT DOCUMENTS

| 6,306,525 | B1 | 10/2001 | Schicht et al. | |
|---|---|---|---|---|
| 2006/0046089 | A1 | 3/2006 | O'Shaughnessy et al. | |
| 2006/0139783 | A1 | 6/2006 | Decroupet et al. | |
| 2007/0218311 | A1 | 9/2007 | O'Shaughnessy et al. | |
| 2009/0004412 | A1* | 1/2009 | Decroupet et al. | 428/34 |
| 2009/0011205 | A1* | 1/2009 | Thiel | 428/215 |

FOREIGN PATENT DOCUMENTS

| EP | 0 922 681 | 6/1999 |
|---|---|---|
| WO | 2004 071984 | 8/2004 |
| WO | 2006 048462 | 5/2006 |

OTHER PUBLICATIONS

O'Bannon, Dictionary of Ceramic Science and Engineering, 1984, pp. 230 and 258.*

* cited by examiner

*Primary Examiner* — David Sample
(74) *Attorney, Agent, or Firm* — Oblon, Spivak, McClelland, Maier & Neustadt, L.L.P.

(57) ABSTRACT

The present invention relates to essentially transparent glazings comprising a system of films deposited under vacuum by magnetron, and having antisun and/or low-emission properties, comprising as protective surface layer a layer based on titanium oxide and on at least one other metal oxide of high hardness from the group comprising: $ZrO_2$, $SiO_2$, $Cr_2O_3$. The glazings according to the invention are of "matchable" type.

21 Claims, 2 Drawing Sheets

FILM COATED GLAZING HAVING A PROTECTIVE LAYER OF MIXED TITANIUM OXIDE

The present invention relates to glazings comprising a set of thin layers that impart antisun or low-emission properties, which can withstand heat treatments of bending/toughening type. These glazings have, before and after this heat treatment, optical properties (transmission, reflection, colour) that are similar enough to allow simultaneous use in the same assembly comprising components not subjected to the heat treatment and others that have been subjected to this treatment, without the differences that may result therefrom being too obvious. Glazings of this type are commonly referred to as "matchable" or "self-matchable".

The most common coatings for the glazings in question are made via magnetron-assisted vacuum deposition techniques, and invariably comprise one or more infrared-reflecting layers very generally based on metallic silver. To preserve the quality of these metallic layers, especially to protect them against mechanical and above all chemical impairments, but also to ensure that the reflection operates selectively on infrared rays, allowing as many as possible of the visible wavelengths to pass through, the silver-based layer(s) are included in sets of dielectric layers.

Antisun or low-emission glazings may achieve noteworthy performance both in terms of the thermal characteristics and in terms of the optical aspects. They may especially show very high selectivity: in other words they may constitute powerful filters for infrared rays, while allowing visible wavelengths to pass through. Under the best conditions, they may offer perfect colour neutrality especially in reflection, avoiding undesired colorations.

Glazings coated with antisun or low-emission layers that may undergo heat treatments of the bending/toughening type without their properties being significantly impaired are known. They comprise layer systems that protect the metallic layers, especially against oxidation. These systems typically comprise several types of layers that contribute towards this protection.

Such layers are especially layers arranged over all the others and covering them. These layers have a protective role against all external attack, moisture, oxidation, etc. They must also be resistant to mechanical stresses, wear, scratching, etc. Layers of this type are mainly layers of nitrides or oxynitrides such as $Si_3N_4$, TiN, $SiAl_xO_yN_z$, $TiN_wO_v$.

It is also a case of layers that are in immediate contact with the silver-based layers, known as "barrier" layers. These layers must protect the silver against impairment that may arise from contact with neighbouring layers or constituents of the layers that are liable to migrate especially under the conditions of the heat treatments under consideration. These layers are particularly useful in dielectric layer systems formed from metal oxides.

Other layers may also have an influence on the "matchable" nature, if their characteristics are modified by exposure to high temperatures.

One aim of the invention is to propose glazings coated with layer systems such that, whether or not they are subjected to a heat treatment under conditions of the type corresponding to a bending/toughening operation, they can be used in combination, the differences in the optical properties of these glazings remaining sufficiently limited.

In practice, it is accepted as a quantified criterion of the "matchable" nature that the difference in optical properties of products without heat treatment and after this treatment satisfies the condition:

$$\Delta E=[(\Delta L^*)^2+(\Delta a^*)^2+(\Delta b^*)^2]^{1/2} \leq 4$$

preferably:

$$\Delta E \leq 2$$

and particularly preferably:

$$\Delta E \leq 1$$

In these expressions, $L^*$, $a^*$ and $b^*$ are the colorimetric coordinates expressed in the CIELAB system (illuminant D, at) 10°.

This characteristic mainly concerns the visible light reflected outwards by the glazings. The assessment of the colour differences is particularly acute for this type of reflection, since buildings need to have a uniform appearance for all of their glazings. To a lesser extent, it is advantageous for the same condition to be satisfied as regards reflection inwards, although it is much less common simultaneously to have a view of several glazings, some heat-treated and others not. Finally, it is also preferable to ensure that this condition is also satisfied as regards the light transmitted by these glazings.

The heat treatment to which the glazings may be subjected, a treatment of the bending or toughening type, leads to temperatures of the order of 500 to 700° C. for several minutes. For ease of comparison, a treatment at 550° C. for 5 minutes is taken as reference.

Beyond the desired optical qualities, the glazings in question must also show sufficient resistance to the various attacking factors to which they may be exposed. These are especially chemical attacking factors: air, water, saline fogs, etc., but also mechanical attacking factors encountered in the course of transportation or transformation during their use.

The outermost layers of these layer systems must especially give these systems chemical resistance and mechanical strength properties while, needless to say, not impairing the other properties. As a guide, layers which are nevertheless renowned for their mechanical strength, especially certain carbides such as those of titanium or zirconium, are too absorbent to be able to be used even at very low thicknesses.

Various prior proposals have at least partially addressed the requirements associated with these surface layers, also known as "top coats". Among the layers most commonly used are especially titanium oxide layers, tin oxide layers, silica layers, and nitride and especially silicon nitride layers. From experience, titanium oxide or tin oxide layers are too sensitive to the heat treatment. Titanium nitrides, and especially zirconium oxynitrides, show good resistance to the heat treatments, but these layers show substantial variations in light transmission before and after treatment, and therefore do not allow "matchable" glazings to be obtained.

Surface layers have been proposed for "matchable" glazings. These are especially silica and silicon nitrides. The deposition of silica is very difficult, and silicon nitride layers show insufficient scratch resistance.

The invention proposes antisun or low-emission glazings coated with layer systems that give them the quality of "matchable" glazings.

To this end, the invention proposes to use glazings coated with layer systems comprising as a surface layer a layer based on titanium oxide and on at least one other metal oxide of high hardness, from the group comprising: $ZrO_2$, $SiO_2$, $Cr_2O_3$.

The respective proportions of titanium oxide and of the other metals may cover a wide range of mixtures. In order for the effect to be noticeable, the additional oxide(s) must represent at least 5% by weight and preferably at least 10% by weight of the whole.

In the mixed oxide, the titanium oxide is present to a proportion of at least 40% by weight and preferably at least 50% by weight.

In a particularly preferred manner, titanium oxide represents at least 55% by weight.

In the mixed oxides used according to the invention, in addition to titanium oxide, zirconium oxide is particularly preferred. It is advantageously present in a proportion of 15% to 50% by weight of the surface layer.

Besides the oxides of titanium and of the metals listed above, the surface layer according to the invention may also contain additional oxides that are practically indissociable from the preceding oxides. This is particularly the case for lanthanides, for instance yttrium oxide or hafnium oxide. When these additional oxides are present, their content remains relatively limited and does not exceed 5% by weight of the whole.

To play its role satisfactorily, the protective surface layer must have a certain thickness, but a relatively modest thickness may suffice. Preferably, the thickness of this layer is not less than 3 nm.

Given that the oxides included in the composition of this surface layer are transparent, it is possible to use much thicker layers than would be necessary to improve the resistance to the heat treatment. It is especially possible to use this protective layer as a component of the interference filter, in other words as a layer that significantly participates in maintaining high visible transmission and in establishing good reflection neutrality.

The surface layer used as component of the interference filter is advantageously combined with other dielectric layers. The choice of the assembly then takes into account not only the optical or structural properties of the various layers (index, transparency, crystal structure, interface quality), but also the relative ease of formation of these layers.

Whatever the structure considered, in practice the surface layer according to the invention remains at a thickness of not more than 35 nm.

The surface layers according to the invention are sparingly sensitive or insensitive to bending or toughening heat treatments. When subjected to a temperature of at least 550° C. for 5 minutes and for a thickness of 20 nm, their light transmission does not vary by more than 0.1%.

Moreover, the coated glazings according to the invention advantageously have a scratch resistance, according to the method that is the subject of standard ASTM 2486D, of not greater than 20%.

The coated glazings according to the invention also offer very good resistance in humidity tests. When subjected to the "Cleveland" test according to standard ISO 6270, for 3 days, the level reached is advantageously at least 3. For the samples subjected to the saline spray test according to standard EN 1096, the result is advantageously greater than 3 after 2 days of exposure.

In order to have layer systems that lead to "matchable" glazings, it is necessary for virtually all the layers to be insensitive to the conditions to which the glazing is subjected.

Among the layers used, some are more particularly liable to be modified. These are, for example, layers which, by nature, may become transformed under the effect of the temperature, and especially layers whose crystallographic structure may be modified. It is known practice, for example from the published European patent application EP 1 980 539 in the name of the Applicant, to use dielectric layers based on titanium oxide comprising a foreign oxide that opposes the crystallographic changes of the oxide in question, when it is subjected to bending or toughening temperatures.

It is also a case of layers whose transformation arises from a chemical alteration due either to reactions of the constituents of the layers with each other, or to reaction with the components of the atmosphere in the heat treatment under consideration. These layers are the ones that are especially liable to react by oxidation.

Among these layers are notably those that are especially reactive to oxygen. "Sacrificial" or "barrier" layers particularly correspond to these characteristics.

The barrier layers most commonly proposed previously for "matchable" glazings are especially layers of a nickel and chromium oxide alloy. However, these layers, which are relatively easy to deposit, do not offer the best characteristics. They are relatively less transparent than other layers such as those based on titanium oxide.

The constitution of the barrier layers must, specifically, satisfy a set of conditions that are in principle sparingly compatible. Starting from the idea that they must readily fix or be capable of readily fixing oxygen, these layers are usually constituted such that they have an oxygen deficit compared with strictly stoichiometric compositions. As regards the barrier layers, a difficulty arises in that they are deposited directly onto a silver layer, and that the conditions of their deposition must be perfectly controlled in order to prevent any impairment of the silver layer.

For this reason, deposition under a non-oxidative atmosphere appears to be preferable in principle. The inventors have shown, however, that the choice of deposition under these conditions of an oxide barrier layer is not entirely satisfactory in the production of "matchable" products. The reason for this is that the oxide layers deposited under a non-oxidative atmosphere lead to products that are invariably under-oxidized, which, when subjected to a heat treatment, lead to significant additional oxidation and thereafter to substantial modification of the properties of the barrier layer concerned. These modifications may give rise to more or less substantial changes in the opto-energetic characteristics of the glazings.

When the deposition of the barrier layer is performed using metallic targets, the presence of oxygen in the atmosphere during the deposition is necessary. In the absence of oxygen, the barrier would be very largely under-oxidized and would show extreme sensitivity to the subsequent heat treatments.

The practice consisting in forming oxide barrier layers from oxidized targets, known as "ceramic" targets, leads to an oxide barrier layer even in a non-oxidative atmosphere. However, the oxidation of the layer is incomplete. For this reason, subsequent impairment of this barrier during the heat treatment remains possible. It is thus preferable according to the invention, in order to achieve a degree of oxidation close to the stoichiometry, to perform the process under an oxidative atmosphere even in depositions using ceramic targets.

According to the invention, barrier layers based on titanium oxide are advantageously used. These layers are advantageously mixed layers of titanium oxide doped with an oxide of a metal from among zirconium, niobium and tantalum.

The conditions for deposition of the surface layers are in principle less restrictive insofar as the choice of an oxidative atmosphere for a deposition using metallic targets presents less risk of leading to impairment of the silver layers that are previously covered with other dielectric layers. Moreover, since the use of ceramic targets generally leads to great stability of the deposition process, particularly for certain constituents such as titanium, these ceramic targets are generally preferred to metallic targets.

Even more so than for the barrier layers, complete oxidation of the surface layers is necessary. Since these layers are directly exposed during the heat treatments, they are subjected to highly oxidative conditions. In order for them not to undergo substantial modifications during such treatments, it is thus necessary from the outset to form layers that are substantially fully oxidized.

To preserve good structure of the silver-based layers, it is preferred according to the invention to deposit them onto a layer that promotes good regularity of growth. Layers that are particularly preferred, which satisfy this characteristic, are layers based on zinc oxide, and especially tin-doped zinc oxide layers.

The systems according to the invention comprise one, two or three silver layers each with a thickness of 7 to 20 nm.

The invention is described in detail in the following examples, which are also the subject of the attached figures in which.

Figure 1:
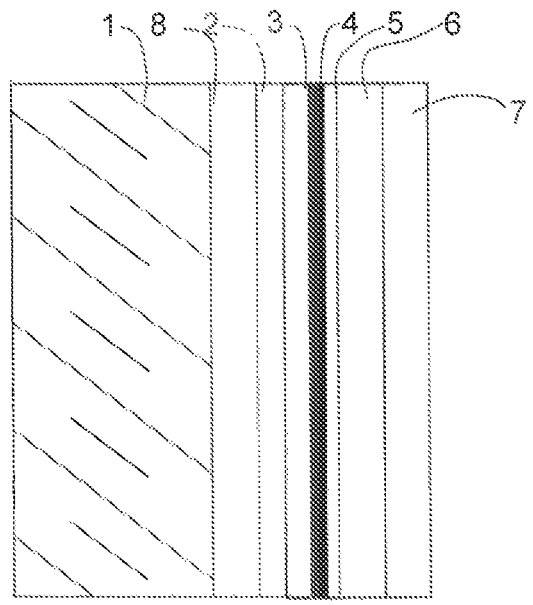
FIG. 1 is a schematic representation of a cross section of a glazing coated with a layer system according to the invention.

The glazing of FIG. 1 is shown in cross section without respecting the proportions of the various components, for the sake of clarity. The pane of glass 1 is coated with a set of layers comprising an infrared-reflecting silver-based layer 4. This silver layer is arranged between two sets of dielectric layers that protect it and give it good light transmission with good reflection neutrality.

The silver layer 4 is advantageously deposited on a layer 3 based on zinc oxide. Zinc oxide layers and layers based on doped zinc oxide are known for promoting the formation of a good interface with silver layers, and improve as a whole the properties of these layers. For the same amount of silver per unit area, the conduction, and hence the emissivity of the layers, are improved when they are deposited in this way. It may be a case of a low thickness of zinc oxide alone, the thickness of which is not greater than 15 nm. The presence of this layer leads to a very uniform interface without any roughness. Thereafter, for a given amount of silver, the layer offers high conductivity.

When the thickness of zinc oxide is larger, there is a risk of developing columnar growth, which leads to a less uniform interface with increased roughness. To avoid this type of growth, it is known practice to dope the zinc oxide with other oxides, especially tin or aluminium oxide.

The layers formed from zinc tin mixed oxide are conventionally of two types. The layers on which the silver layers are deposited advantageously have a low content of tin oxide, especially of about 10% by weight. As indicated previously, these layers are relatively thin and do not exceed 15 nm. The second type of zinc and tin mixed oxide layer is used to constitute in dielectric assemblies the main part of the optical path for dereflective effects. In this function, the layer(s) in question ordinarily have thicknesses of several tens of nanometers. Typically, layers of this type are formed from a mixed oxide containing about 50% by weight of each of the zinc and tin oxides. These layers have the advantage of having great stability in particular during the heat treatments to which the glazings may be subjected.

In the example shown in FIG. 1, a protective layer 5 is deposited on the silver layer 4. This is a conventional layer whose purpose is to protect the silver layer against impairments that might affect it especially during the subsequent depositions, in particular when these depositions are performed in a reactive mode, for example under an oxidative atmosphere. The layer 5 is referred to as a "barrier" or "sacrificial" layer. It intervenes by reacting with the atmosphere under which the subsequent layers are deposited, which, in the absence of this layer, would be liable to react with the silver layer. These sacrificial layers are of very low thicknesses. They are not more than 6 nm and their thickness is preferably 2 or 3 nm. They are conventionally based on oxide, especially of titanium or of an NiCr mixed oxide, the titanium oxide offering the advantage of very high transparency at the visible wavelengths. Since they are deposited to be able to react while protecting the silver, they are often formed from targets of the corresponding metals, and oxidized in the following constitution of the stack. For this reason, the layers are often sub-stoichiometric. It is also possible to deposit them using ceramic targets that are themselves sub-stoichiometric. This way of proceeding makes it possible more conveniently to achieve in the final layer good oxidation in the region of the stoichiometry. In this manner, the extinction coefficient of the layer is very low.

In FIG. 1, layers 2, 6 and 8 are layers included in the constitution of the infrared filter. They make it possible to prevent reflection of the majority of the rays in the visible region. By virtue of these layers, the colour of the transmitted light and above all of the reflected light is also controlled, it being known that, in the vast majority of applications, every effort is made for the latter to ensure that this light is as weak and as neutral as possible.

The conventional dielectric layers are mainly formed from oxides of: Zn, Sn, Ti, Al, Zr, Nb. Their thickness depends on the required optical path, which itself is dependent on the thickness of the infrared-reflecting layer. The relationships between these magnitudes (thicknesses, indices) are perfectly established by known physical relationships. The determination of the thicknesses forms the subject of simulations by means of widely available programs. Starting from the values thus determined, the subsequent adjustments are made to take into account the differences that may exist between the effective structure, composition or configuration characteristics and the corresponding characteristics of the ideal layers.

The surface layer 7 is a layer according to the invention based on titanium oxide comprising an oxide that imparts particularly effective resistance ($ZrO_2$, $SiO_2$, $Cr_2O_3$).

A stack (I) of this type in accordance with the invention is formed, starting from the glass, by the following layers:

| | layer | | | | | | |
|---|---|---|---|---|---|---|---|
| | 8<br>$ZSO_9$ | 2<br>TiZrOx | 3<br>AZO | 4<br>Ag | 5<br>TiOx | 6<br>$ZSO_9$ | 7<br>TiZrOx |
| I | 180 | 100 | 60 | 120 mg/m$^2$ | 20 | 210 | 160 |

In this table:
ZSO9 denotes a layer of zinc oxide doped with 10% by weight of tin oxide;
TiOx is an under-oxidized titanium oxide;
TiZrOx is a mixed titanium oxide comprising, on a weight basis, 50% of $TiO_2$, 46% of $ZrO_2$, the remainder being formed from elements usually accompanying zirconium, especially the oxide $Y_2O_5$;
the thicknesses are expressed in Angstroms.

The deposition of the layers is performed on a pane of clear glass 4 mm thick.

The constituted samples are divided into two batches. The first is stored without modification. The second is subjected to a treatment at 550° C. in an oven for 5 minutes. The properties of these batches of samples are compared. The properties under consideration are the visible transmission, Tv, the glass-side reflection, Rv, the layer-side reflection, Ri, and the normal emissivity En.

|    | without treatment | after treatment | difference |
|----|-------------------|-----------------|------------|
| Tv | 78.21             | 79.01           | 0.8        |
| Rv | 11.53             | 11.57           | 0.04       |
| Ri | 11.88             | 11.95           | 0.07       |
| En | 0.047             | 0.047           | 0          |

The differences are very small. The largest is that concerning the visible transmission, but it remains less than 1%. This difference is not perceptible to the eye.

The glass is assembled as an insulating glazing. The coated pane is combined with a 4 mm pane not comprising any layers. The gap between the two panes of glass is 16 mm. In the assembly, the layers are turned towards the gap between the panes. The colour variations between the two series of samples are measured. The colours are noted according to the CIELAB system. The determination concerns the transmitted light, T, and the light reflected inward, Ri, or outward, Re. The layer system is in position 3 starting from the face turned towards the external incident light.

|    | without treatment | | | after treatment | | | |
|----|------|-------|------|------|-------|------|------|
|    | L*   | a*    | b*   | L*   | a*    | b*   | ΔE   |
| T  | 90.83 | -3.05 | 2.77 | 91.16 | -2.77 | 3.26 | 0.98 |
| Re | 40.62 | 0.63  | -4.45 | 40.68 | 0.27  | -4.41 | 0.37 |
| Ri | 41.26 | -0.06 | -6.8 | 41.39 | -0.28 | -7.17 | 0.45 |

The colorimetric measurements show for all the categories, transmitted or reflected, variations that all remain less than 1. In particular, the most substantial reflections, especially those directed outwards, are very sparingly modified. The glazings appear virtually identical.

Several other assemblies of layers noted, respectively, as II, III and IV in the following tables are prepared, all comprising a surface layer based on titanium oxide mixed with zirconium or niobium. Moreover, the deposition conditions for the surface layer, but also for some of the sacrificial layers, differ according to the examples. Some of these layers are deposited under an entirely neutral atmosphere (Ar), and others under an atmosphere formed from a mixture of argon with a small proportion of oxygen (ArO$_2$, containing 5% O$_2$).

Figure 2:
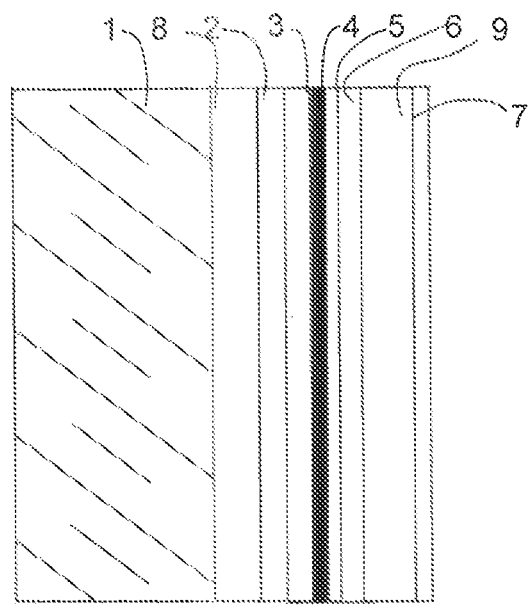
FIG. 2 illustrates another layer system according to the invention.

The assemblies of layers are as represented in FIG. 2. In all the examples, the first layer (8) in contact with the pane of glass is a zinc tin mixed oxide layer containing 50% by weight of each of the constituents (ZSO5).

The second layer (2) is a mixed oxide layer based on titanium zirconium oxide (TiZrOx) or titanium niobium oxide (TiNbOx). The proportion of zirconium or niobium oxide is, as previously, 46% by weight, and the proportion of titanium oxide is 50%. In examples III and IV, this layer is deposited under an atmosphere containing oxygen, whereas for example 2, the atmosphere is argon alone.

In example III, the layer 2 is directly in contact with the silver layer. In examples II and IV, an intercalating layer (3) intended to promote uniform growth of the silver layer is interposed. In example II, it is a layer of zinc oxide doped with 10% tin oxide (ZSO$_9$). For example IV, this layer (ZnO—Al) is zinc oxide doped with aluminium (4% by weight).

The silver layer (4) in the three examples is 120 mg/m$^2$.

The barrier layer (5) is, respectively, titanium zirconium mixed oxide (TiZrOx) for example II, titanium niobium mixed oxide (TiNbOx) for example III, and under-oxidized titanium oxide alone (TiOx) for example IV. All the barrier layers (5) are deposited under an argon atmosphere.

In examples II and IV, a layer of zinc oxide doped with 10% tin oxide (6) is superposed on the barrier layer (5).

The thickest dielectric layer (9) is formed from zinc tin mixed oxide at 50% by weight (ZSO$_5$) for the three examples.

The surface layer (7) is of the same nature as layer (2), TiZrOx or TiNbOx, and is deposited under the same atmosphere conditions (argon alone or argon with 5% oxygen).

The thicknesses of the layers are reported in the following table. The thicknesses are given in Angströms.

|     | 8    | 2 TiZrOx (Ar) TiZrOx (ArO$_2$) TiNbOx (ArO$_2$) | 3    | 4    | 5 TiZrOx (Ar) TiNbOx (Ar) | 6    | 9    | 7 TiZrOx (Ar) TiNbOx (ArO$_2$) |
|-----|------|-----------|------|------|-----------|------|------|-----------|
|     | ZSO$_5$ | TiZrOx (ArO$_2$) | ZSO$_9$ ZnO—Al | Ag mg/m$^2$ | TiOx (Ar) | ZSO$_9$ | ZSO$_5$ | TiZrOx (ArO$_2$) |
| II  | 180  | 100       | 80   | 120  | 50        | 80   | 235  | 60        |
| III | 250  | 80        | —    | 120  | 50        | —    | 300  | 60        |
| IV  | 180  | 100       | 80   | 120  | 50        | 80   | 200  | 100       |

The measurements of the properties of these three examples are given as previously, by comparing the values without heat treatment and after this treatment. The measurements are taken on an insulating glazing comprising, as previously, a 4 mm pane of glass 16 mm away from the pane comprising the layer system. The layers are on the face in position 3 counting from the exterior of the glazing.

| II | without treatment | after treatment | difference |
|---|---|---|---|
| Tv | 76.9 | 78.6 | 1.7 |
| Re | 11.6 | 11.8 | 0.2 |
| Ri | 11.3 | 11.6 | 0.3 |
| En | 0.062 | 0.044 | −0.018 |

| | without treatment | | | after treatment | | | |
|---|---|---|---|---|---|---|---|
| II | L* | a* | b* | L* | a* | b* | ΔE |
| T | 90.2 | −3.7 | 3.8 | 91.0 | −2.7 | 2.7 | 1.7 |
| Re | 40.7 | −1.6 | −4.9 | 41.1 | −0.5 | −7.1 | 2.5 |
| Ri | 40.3 | 0.5 | −5.6 | 40.8 | 0.4 | −5.6 | 0.5 |

| III | without treatment | after treatment | difference |
|---|---|---|---|
| Tv | 75.0 | 75.2 | 0.2 |
| Re | 12.9 | 13.3 | 0.4 |
| Ri | 11.8 | 12.1 | 0.3 |
| En | 0.08 | 0.055 | −0.025 |

| | without treatment | | | after treatment | | | |
|---|---|---|---|---|---|---|---|
| III | L* | a* | b* | L* | a* | b* | ΔE |
| T | 89.3 | −2.7 | 2.5 | 89.4 | −1.0 | 3.4 | 1.9 |
| Re | 42.9 | −2.5 | −8.2 | 43.5 | −3.2 | −8.3 | 0.8 |
| Ri | 41.1 | −1.2 | −6.9 | 41.7 | −1.7 | −7.17 | 1.3 |

| IV | without treatment | after treatment | difference |
|---|---|---|---|
| Tv | 78.2 | 79.0 | 0.8 |
| Re | 11.5 | 11.6 | 0.1 |
| Ri | 11.9 | 12.0 | 0.1 |
| En | 0.047 | 0.047 | 0 |

| | without treatment | | | after treatment | | | |
|---|---|---|---|---|---|---|---|
| IV | L* | a* | b* | L* | a* | b* | ΔE |
| T | 90.8 | −3.1 | 2.8 | 91.2 | −2.3 | 3.3 | 1.0 |
| Re | 40.6 | 0.6 | −4.5 | 40.7 | 0.3 | −4.4 | 0.4 |
| Ri | 41.3 | −0.1 | −6.8 | 41.4 | −0.3 | −7.2 | 0.4 |

The tests show great stability of the optical properties of the systems that do not comprise under-oxidized surface layers, i.e. the layers 7 deposited under an oxidative atmosphere. Systems III and IV both satisfy this condition. Conversely, example II, which comprises a surface layer deposited under a non-oxidative atmosphere, is sensitive to the heat treatment test. This example is all the more sensitive since it also comprises a barrier layer 2, which is also deposited under a non-oxidative atmosphere, and which is liable to be modified during the heat treatment.

Figure 3:
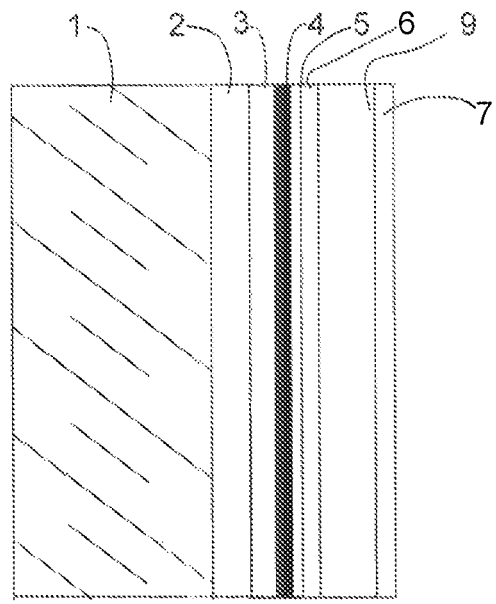
FIG. 3 illustrates yet another layer system according to the invention.

The preceding tests performed on pilot deposition plants were followed by tests on industrial lines to check the stability of the results previously obtained. In all these tests, the layer system represented schematically in FIG. 3 is as follows:

| 2 | 3 | 4 | 5 | 6 | 9 | 7 |
|---|---|---|---|---|---|---|
| ZSO$_5$ | ZSO$_9$ | Ag | ZnO—Al | ZSO$_9$ | ZSO$_5$ | TiZrOx |
| 250 | 100 | 120 mg/m² | | 100 | 250 | |

Six series of products referenced V to X are prepared, the only differences among which concern the thickness of the barrier layer 5 and that of the surface layer 7. The thicknesses in question are in Angstroms:

| | V | VI | VII | VIII | IX | X |
|---|---|---|---|---|---|---|
| ZnO—Al | 30 | 15 | 60 | 23 | 94 | 23 |
| TiZrOx | 63 | 63 | 63 | 35 | 35 | 17.5 |

They lead as previously in the constituted insulating glazings to the following results:

| V | without treatment | after treatment | difference |
|---|---|---|---|
| Tv | 79.3 | 80.5 | −1.2 |
| Re | 12.5 | 12.7 | 0.2 |
| Ri | 12.9 | 12.9 | 0 |
| TIR | 0.076 | 0.057 | 0.019 |
| R Ω/□ | 6.73 | 4.44 | 2.29 |

| | without treatment | | | after treatment | | | |
|---|---|---|---|---|---|---|---|
| V | L* | a* | b* | L* | a* | b* | ΔE |
| T | 91.3 | −1.7 | 2.7 | 91.9 | −1.5 | 2.6 | 0.6 |
| Re | 42.1 | −2.6 | −4.5 | 42.6 | −2.5 | −5.4 | 1.0 |
| Ri | 42.8 | −3.4 | −5.7 | 42.9 | −3.0 | −6.5 | 0.9 |

| VI | without treatment | after treatment | difference |
|---|---|---|---|
| Tv | 79.4 | 80.3 | −0.9 |
| Re | 12.2 | 12.6 | −0.4 |
| Ri | 12.4 | 12.6 | −0.2 |
| TIR | 0.07 | 0.054 | 0.016 |
| R Ω/□ | 5.52 | 5.43 | 0.09 |

| | without treatment | | | after treatment | | | |
|---|---|---|---|---|---|---|---|
| VI | L* | a* | b* | L* | a* | b* | ΔE |
| T | 91.4 | −1.9 | 2.6 | 91.8 | −1.5 | 2.7 | 0.6 |
| Re | 41.7 | −2.2 | −4.7 | 42.3 | −2.4 | −5.4 | 0.9 |
| Ri | 42.1 | −3.0 | −6.2 | 42.5 | −2.6 | −6.9 | 0.9 |

| VII | without treatment | after treatment | difference |
|---|---|---|---|
| Tv | 78.7 | 77.5 | 1.2 |
| Re | 12.7 | 12.8 | −0.1 |
| Ri | 13.4 | 13.8 | −0.4 |
| TIR | 0.071 | 0.065 | 0.006 |
| R Ω/□ | 5.63 | 5.4 | 0.23 |

| | without treatment | | | after treatment | | | |
|---|---|---|---|---|---|---|---|
| VII | L* | a* | b* | L* | a* | b* | ΔE |
| T | 91.0 | −2.1 | 3.4 | 90.5 | −1.1 | 3.1 | 1.1 |
| Re | 42.6 | −2.1 | −6.9 | 42.7 | −2.2 | −6.4 | 0.5 |
| Ri | 43.6 | −3.0 | −7.4 | 44.2 | −3.2 | −7.9 | 0.8 |

| VIII | without treatment | after treatment | difference |
|---|---|---|---|
| Tv | 79.3 | 80.4 | −1.1 |
| Re | 12.4 | 12.6 | −0.2 |
| Ri | 12.8 | 13.0 | −0.2 |
| TIR | 0.064 | 0.055 | 0.009 |
| R Ω/□ | 5.11 | 4.33 | 0.78 |

| | without treatment | | | after treatment | | | |
|---|---|---|---|---|---|---|---|
| VIII | L* | a* | b* | L* | a* | b* | ΔE |
| T | 91.3 | −2.1 | 3.2 | 91.8 | −1.7 | 3.1 | 0.7 |
| Re | 42.1 | −2.0 | −6.0 | 42.3 | −2.1 | −6.4 | 0.5 |
| Ri | 42.8 | −2.8 | −7.0 | 43.1 | −2.7 | −7.4 | 0.5 |

| IX | without treatment | after treatment | difference |
|---|---|---|---|
| Tv | 76.8 | 76.5 | 0.3 |
| Re | 14.6 | 14.7 | −0.1 |

-continued

| | Ri | 15.8 | 16.0 | −0.2 |
|---|---|---|---|---|
| | TIR | 0.067 | 0.068 | −0.001 |
| | R Ω/□ | 5.64 | 5.6 | 0.04 |

| | without treatment | | | after treatment | | | |
|---|---|---|---|---|---|---|---|
| IX | L* | a* | b* | L* | a* | b* | ΔE |
| T | 90.1 | −1.9 | 4.4 | 90.0 | −1.0 | 3.8 | 1.0 |
| Re | 45.3 | −2.6 | −8.6 | 45.4 | −3.0 | −7.0 | 1.7 |
| Ri | 47.0 | −3.6 | −7.6 | 47.3 | −3.8 | −7.3 | 0.5 |

| X | without treatment | after treatment | difference |
|---|---|---|---|
| Tv | 79.1 | 80.0 | −0.9 |
| Re | 12.5 | 12.9 | −0.4 |
| Ri | 13.1 | 13.3 | −0.2 |
| TIR | 0.058 | 0.058 | 0 |
| R Ω/□ | 5.06 | 4.34 | 0.72 |

| | without treatment | | | after treatment | | | |
|---|---|---|---|---|---|---|---|
| X | L* | a* | b* | L* | a* | b* | ΔE |
| T | 91.2 | −2.1 | 3.4 | 91.6 | −1.6 | 3.3 | 0.7 |
| Re | 42.2 | −1.9 | −6.5 | 42.9 | −2.2 | −6.7 | 0.8 |
| Ri | 43.2 | −2.8 | −7.3 | 43.6 | −2.6 | −7.8 | 0.7 |

The invention claimed is:

1. An essentially transparent glazing comprising a system of films deposited under vacuum by magnetron and having antisun properties, low-emission properties, or both properties, the system of films comprising:

a silver-comprising infrared-reflecting layer;

a metal oxide barrier layer contacting and covering the infrared-reflecting layer, a dielectric layer on which the infrared-reflecting layer is deposited, or both; and a top coat comprising a mixed oxide, the mixed oxide comprising titanium oxide and at least one other metal oxide of high hardness selected from the group consisting of: $ZrO_2$, $SiO_2$, and $Cr_2O_3$, wherein colorimetric characteristics of light transmission (Tv), of layer-side reflection (Re), and of glass-side reflection (Ri), are such that, in the CIELAB coordinates for 10°, variations observed in the glazing, before and after heat treatment at 550° C. for 5 minutes, satisfy a relationship:

$$\Delta E = [(\Delta L^*)^2 + (\Delta a^*)^2 + (\Delta b^*)^2]^{1/2} \leq 4,$$

for each transmission and reflection.

2. The glazing according to claim 1, wherein the variations observed for the layer-side reflection (Re) satisfy a relationship:

$$\Delta E = [(\Delta L^*)^2 + (\Delta a^*)^2 + (\Delta b^*)^2]^{1/2} \leq 1.$$

3. The glazing according to claim 2, wherein the colorimetric characteristics of glass-side reflection (Ri) and transmission satisfy a condition:

$$\Delta E = [(\Delta L^*)^2 + (\Delta a^*)^2 + (\Delta b^*)^2]^{1/2} \leq 1.$$

4. The glazing according to claim 2, wherein the titanium oxide represents at least 40% by weight of the top coat.

5. The glazing according to claim 3, wherein the titanium oxide represents at least 40% by weight of the top coat.

6. The glazing according to claim 1, wherein the titanium oxide represents at least 40% by weight of the top coat.

7. The glazing according to claim 1, wherein the top coat further comprises up to 5% by weight of at least one additional metal oxide, based on a weight of all oxides of the top coat.

8. The glazing according to claim 1, wherein the top coat comprises 15% to 50% by weight of zirconium oxide.

9. The glazing according to claim 1, wherein the top coat has a thickness not less than 3 nm.

10. The glazing according to claim 1, wherein the top coat has a thickness not greater than 35 nm.

11. The glazing according to claim 1, wherein the at least one other metal oxide of the top coat, besides the titanium oxide, is at least 5% by weight of the top coat.

12. The glazing according to claim 1, wherein the infrared-reflecting silver comprising layer is contacted by and covered with a metal oxide barrier layer deposited from ceramic targets and under a slightly oxidative atmosphere.

13. The glazing according to claim 12, wherein the barrier layer comprises titanium oxide.

14. The glazing according to claim 12, wherein the barrier layer comprises a mixed oxide comprising titanium oxide and at least one oxide selected from the group consisting of zirconium oxide, niobium oxide, aluminum oxide, and tantalum oxide.

15. The glazing according to claim 1, comprising:

a dielectric layer between the glass substrate and a first silver-comprising layer, a dielectric layer over a last silver-comprising layer that is furthest from the substrate, and if the glazing comprises more than one silver-comprising layer, a dielectric layer between each silver-comprising layer.

16. The glazing according to claim 15, comprising one, two, or three silver-comprising layers, each with a thickness of 7 to 20 nm.

17. The glazing according to claim 15, wherein the silver-comprising layer is deposited on a layer comprising zinc oxide optionally doped with tin, aluminum or gallium.

18. The glazing according to claim 1, wherein the top coat comprises titanium oxide and $ZrO_2$.

19. The glazing of claim 1, wherein the infrared-reflecting layer is deposited on a layer comprising zinc oxide.

20. The glazing of claim 19, wherein the zinc oxide is doped with tin.

21. The glazing of claim 1, comprising a dielectric layer capable of promoting a good regularity of growth on which the infrared-reflecting layer is deposited.

* * * * *